(12) United States Patent
Roehlig

(10) Patent No.: US 10,520,382 B2
(45) Date of Patent: Dec. 31, 2019

(54) PRESSURE SENSOR MODULE WITH SPRING-LOADED ELECTRICAL CONTACT PINS

(71) Applicant: MOOG GmbH, Boeblingen (DE)

(72) Inventor: Thomas Roehlig, Fellbach (DE)

(73) Assignee: MOOG GmbH, Boeblingen (DE)

( * ) Notice: Subject to any disclaimer, the term of this patent is extended or adjusted under 35 U.S.C. 154(b) by 124 days.

(21) Appl. No.: 15/735,119

(22) PCT Filed: Jun. 3, 2016

(86) PCT No.: PCT/EP2016/062669
§ 371 (c)(1),
(2) Date: Dec. 8, 2017

(87) PCT Pub. No.: WO2016/198335
PCT Pub. Date: Dec. 15, 2016

(65) Prior Publication Data
US 2019/0178741 A1    Jun. 13, 2019

(30) Foreign Application Priority Data
Jun. 9, 2015   (DE) .................... 10 2015 109 118

(51) Int. Cl.
*G01L 19/00* (2006.01)
*G01L 19/06* (2006.01)
*G01L 19/14* (2006.01)

(52) U.S. Cl.
CPC ...... *G01L 19/0069* (2013.01); *G01L 19/0084* (2013.01); *G01L 19/0645* (2013.01); *G01L 19/147* (2013.01)

(58) Field of Classification Search
None
See application file for complete search history.

(56) References Cited

U.S. PATENT DOCUMENTS

| 7,077,657 B2 | 7/2006 | Hatanaka |
| 8,505,386 B2* | 8/2013 | Colombo ............ G01L 19/0092 |
| | | 73/715 |

(Continued)

FOREIGN PATENT DOCUMENTS

| DE | 19841334 A1 | 10/1999 |
| DE | 10122330 A1 | 2/2002 |

(Continued)

*Primary Examiner* — Natalie Huls
*Assistant Examiner* — Jermaine L Jenkins
(74) *Attorney, Agent, or Firm* — Douglas Denninger

(57) ABSTRACT

An apparatus for measuring a hydraulic pressure of a hydraulic component, comprising a pressure sensor module and a mounting plate, that is either an outer contour of the hydraulic component or is connectable with the hydraulic component in a substance-to-substance, form-locking and/or force-locking manner, wherein the pressure sensor module comprises a housing, at least one pressure sensor for determining the pressure of a fluid, at least one fluid connector for hydraulic connection of the hydraulic component, at least one electrical connector comprising a conductive mating surface; the mounting plate has a basic area and at least one electrical connecting pin, whereby the connecting pin spring loaded and is essentially perpendicular to the basic area of the mounting plate, the first end of the connecting pin is oriented towards the basic area, the second end of the connecting pin is oriented away from the basic area, and the second end of the connecting pin is pressed, by means of an elastic element, away from the basic area and towards the electrical connector when the mounting plate and the pressure sensor module are assembled and the pressure sensor module and/or the mounting plate have at least one guiding element. The pressure sensor, the fluid connector and the electrical connector are arranged within the housing, the mounting plate is connectable with the pressure sensor module in a force-locking manner and when the mounting (Continued)

plate and the pressure sensor module are assembled, the electrical connecting pin is connected with the electrical connector via its second end.

11 Claims, 9 Drawing Sheets

(56) References Cited

U.S. PATENT DOCUMENTS

| | | |
|---|---|---|
| 2006/0158030 A1 | 7/2006 | Beck et al. |
| 2009/0140572 A1* | 6/2009 | Kim ................... B60T 8/368 |
| | | 303/17 |
| 2009/0272205 A1 | 11/2009 | Brown et al. |

FOREIGN PATENT DOCUMENTS

| | | | |
|---|---|---|---|
| DE | 10322452 A1 | 6/2004 | |
| JP | 10214649 A * | 8/1998 | ............ B41M 5/145 |

* cited by examiner

PRESSURE SENSOR MODULE WITH SPRING-LOADED ELECTRICAL CONTACT PINS

CROSS-REFERENCE TO RELATED APPLICATIONS

This application is a national phase filing under 35 USC § 371 of international application No. PCT/EP2016/062669 filed 3 Jun. 2016, which claims priority to German Application No. 10 2015 109118.6 filed 9 Jun. 2015. The entire contents of each of the above-mentioned applications are incorporated herein by reference.

FIELD OF THE INVENTION

The present invention relates to the field of measuring devices to capture hydraulic pressure of a hydraulic system and to transform the pressure into an electrical signal.

BACKGROUND OF THE INVENTION

Devices to capture hydraulic pressure are known in the art. These devices typically come in a small housing with a pressure sensor inside, e.g. close to the top of that device, and with a screw thread on the bottom of the device. The device can be screwed, by using said thread, into the end of a fluid channel. Wires that are connected to the electrical contacts of said pressure sensor are led outside of the measuring device and either end in a plug, which can be contacted with some electrical controller, or have loose ends, which can be soldered.

One disadvantage of this solution is that exchanging the measuring device is quite complicated: In a first step, the plug has to be unplugged or wires need to be unsoldered. Then, in a next step, the measuring device has to be unscrewed. Another disadvantage of measuring devices according to the state of art is their vulnerability, both against mechanical damaging and against electromagnetic interference (EMI).

SUMMARY OF THE INVENTION

With this background, it is an object of the present invention to provide a measuring device that improves or, at least partly, overcomes the disadvantages of the state of the art.

These and further benefits are set out in claim 1. Further embodiments and optional features of the present invention are set out in the dependent claims.

The present invention discloses an apparatus for measuring a pressure of a hydraulic component. The apparatus comprises a pressure sensor module and a mounting plate. Said mounting plate is either an outer contour of the hydraulic component or is connectable with the hydraulic component in a substance-to-substance, form-locking and/or force-locking manner.

The pressure sensor module comprises a housing, at least one pressure sensor for determining the pressure of a fluid, at least one fluid connector for hydraulic connection of the hydraulic component, and at least one electrical connector comprising a conductive mating surface. In one embodiment, the components of the pressure sensor module are arranged non-detachably.

The mounting plate has a basic area and at least one electrical connecting pin. Said connecting pin is spring loaded and perpendicular to the basic area of the mounting plate, whereby the first end of the connecting pin is oriented towards the basic area, the second end of the connecting pin is oriented away from the basic area, and the second end of the connecting pin is pressed, by means of an elastic element, away from the basic area and towards said electrical connector—which is part of the pressure sensor module —, when the mounting plate and the pressure sensor module are assembled.

The pressure sensor module and/or the mounting plate have at least one guiding element.

In an embodiment according to the present invention, the pressure sensor, the fluid connector, and the electrical connector comprising a conductive mating surface are arranged within the housing. Furthermore, the mounting plate is connectable with the pressure sensor module in a force-locking manner. When the mounting plate and the pressure sensor module are assembled, the electrical connecting pin, which is spring-loaded, is connected with the electrical connector via its second end.

The pressure sensor module comprises a housing that covers the pressure sensor, the fluid connector, and the electrical connector comprising a conductive mating surface. Said housing is, when not assembled, open at its bottom. Said housing is closed, when it is mounted onto said mounting plate of said hydraulic component.

Inside said housing, there is at least one pressure sensor for determining the pressure of a fluid. Said pressure sensor may use at least one of these physical principles for measuring the pressure: piezoelectric, piezo-resistive, capacitive, electromagnetic, potentiometric, optical, resonant, thermal, by using ionization, or other. Said pressure sensor is connected to at least one pressure that exists inside the hydraulic component, connected particularly by a hydraulic channel.

Said pressure sensor provides electrical values, which are transmitted—also inside the housing—to said electrical connector comprising a conductive mating surface. The housing may also be electrically conductive. This may either be used for transmitting electrical signal, e.g. from the pressure sensor, or may be used as electrical ground to protect the at least one sensor—and possibly further electronic devices inside the housing—against electromagnetic interference (EMI).

The mounting plate has a basic area, which is at least partly formed flat. Said basic area may be, for instance, a part of the upper surface of the hydraulic component.

Additionally, said mounting plate has at least one electrical connecting pin, which is spring loaded. Said connecting pin is perpendicular to said basic area of the mounting plate. In one embodiment, said connecting pin is formed straight, with two ends opposing each other.

Said spring loaded connecting pin is oriented towards the basic area. In one embodiment, a wire is connected to the first end of said electrical connecting pin, in order to transmit electrical signals, e.g. from the pressure sensor, to a controlling device. Said first end of the connecting pin may also be implemented as a wire. This wire may be covered, at least partly, for instance by a shrink sleeve.

The second end of said electrical connecting pin is oriented away from the basic area. Hence, the second end of the pin is a loose end, e.g. implemented as a tip. Said second end of the connecting pin is pressed, by means of an elastic element—e.g. by said spring —, away from the basic area of the mounting plate.

Said mounting plate can be connected with said pressure sensor module in a force-locking manner, in order to assemble both parts. When said mounting plate and said pressure sensor module are assembled, the second end, i.e. the tip, of said electrical connecting pin is pressed against said electrical connector, which is part of the pressure sensor module, thus connecting said electrical connecting pin tightly with said electrical connector.

This leads to several benefits over apparatus according to the state of the art. Firstly, the electrical contacts are very well protected against any harm and disturbance, both electrical and mechanical, may it be dust, dirt, or oil, or in accidents, when potentially destroying forces are applied. Furthermore, a very good contact is given between electrical connecting pin and connector. This is even true under rough conditions. The device has been tested successfully, even when applying vibrations with shaking frequencies from 10 to 2000 Hz and an acceleration of 30 g, and no interruption of the electrical contacts took place. Moreover, the vibrations rather led to a closer contact of the electrical connecting pin with the electrical connector.

Moreover, plugging, unplugging, and exchanging the pressure sensor module becomes very easy and can quickly be carried out. In addition, due to the guiding elements, false plugging is avoided effectively.

In one embodiment of an apparatus according to the present invention, the apparatus further comprises a plurality of spring loaded connecting pins and electrical connectors comprising conductive mating surface.

In this embodiment, one spring loaded connecting pin usually is connected to one electrical connector conductive mating surface. In some embodiments, more than one connecting pin may be connected to one electrical connector.

In one embodiment of an apparatus according to the present invention, the apparatus further comprises at least one fixing element that is used for connecting the pressure sensor module and the mounting plate in a form-locking and/or force-locking manner.

Said fixing element may be one or more screws. Alternatively, the fixing element may be a clamp or stirrup, which may be fixed by a spring or by similar elements. As a further alternative, one or more of the existing guiding elements or further guiding elements may be fixed by one or more frictional elements, which hold the guiding elements tightly in place. Fixing elements are can be arranged nearby the hydraulic channels or fluid connector.

In one embodiment of an apparatus according to the present invention, the apparatus further comprises at least one sealant that is arranged between the pressure sensor module and the mounting plate, and/or at least one sealant that is arranged between the fluid connector of the pressure sensor module and the hydraulic connection of the hydraulic component.

The sealant between the pressure sensor module and the mounting plate may not only isolate the components of the pressure module to the environment outside the housing of the pressure sensor module, but may also isolate the electrical components from the components of the pressure module that may bear high pressure, inside the housing. This sealant is for example manufactured as a flat part. In some embodiments, one side of this sealant may be self-adhesive.

The sealant between the fluid connector of the pressure sensor module and the hydraulic connection of the hydraulic component make the complete channel fluid-proof. In some embodiments, this sealant may be an O-ring.

Furthermore, there may be a sealant for the screws, in order to improve the fluid-proofness of the complete apparatus further. The term fluid-proofness in the present application means the imperviousness of fluids. Thus, not only liquids are repelled, but other fluids such as gas as well.

In an embodiment of an apparatus according to the present invention, the pressure sensor has a measuring range from 0 to 400 bar or from 0 to 350 bar.

Hence, both the pressure sensor and the complete apparatus can handle high pressures.

In one embodiment of an apparatus according to the present invention, the apparatus further comprises at least two or three pressure sensors, which are for example one-to-one connected with fluid channels of the hydraulic component, are arranged within the housing.

With more than one pressure sensors, the benefits of the apparatus according to the present invention become even clearer. Both the easy exchangeability, the avoidance of false plugging, and their durability against mechanical damaging and electromagnetic interference are improved. This makes the apparatus advantageous, compared to the state of the art, for a broad range of applications that require pressure sensors, for instance for controlling pressure in industrial machinery, cars, and in other transporting devices, or in high precision scales.

In one embodiment of an apparatus according to the present invention, the housing of the pressure sensor module is manufactured from a group of materials that includes die casting, particularly aluminum die casting, steel, aluminum, fiber-reinforced plastics.

Some housing materials are selected when high EMI resistance is required. Other housing materials are selected when insensitivity against mechanical shock against acids is required. The materials may also be combined, e.g. one material may be coated by the other.

In one embodiment of an apparatus according to the present invention, the electrical connector comprising mating surface is essentially flat, with a size from 2 mm×2 mm to 4 mm×2 mm, and is deformable, in an elastic or plastic manner, particularly in a range from 1% to 20% or from 5% to 10%, of the diagonal of the electrical connector.

This size and deformability make the electrical connector comprising mating surface a good counterpart for the electrical pin that will be connected to the electrical connector. The electrical connector's mating surface may in some embodiments be mated with more than one electrical connector, e.g. with two or three of then, in order to increase conductivity or for redundant and/or fault-tolerant connections. In rough tests, contact is kept even at accelerations of 30 g, applying frequencies in a range from 10 to 2000 Hz.

In one embodiment of an apparatus according to the present invention, the electrical connector comprising mating surface is made e.g. from copper, nickel, aluminum, and is coated with a conductive coat, particularly with gold.

These treatments increase conductivity and reduce oxidation of the contact of the electrical connector.

An apparatus according to the present invention may be used for a hydraulic valve, a hydraulic control and/or steering device, a hydraulic flow control, a hydraulic pressure control, particularly for precision scales and balances.

BRIEF DESCRIPTION OF THE DRAWINGS

The invention will best be understood from the following detailed description of some embodiments of the invention shown in the accompanying drawing, wherein.

DETAILED DESCRIPTION OF THE PRESENTLY PREFERRED EMBODIMENTS

Figure 1:
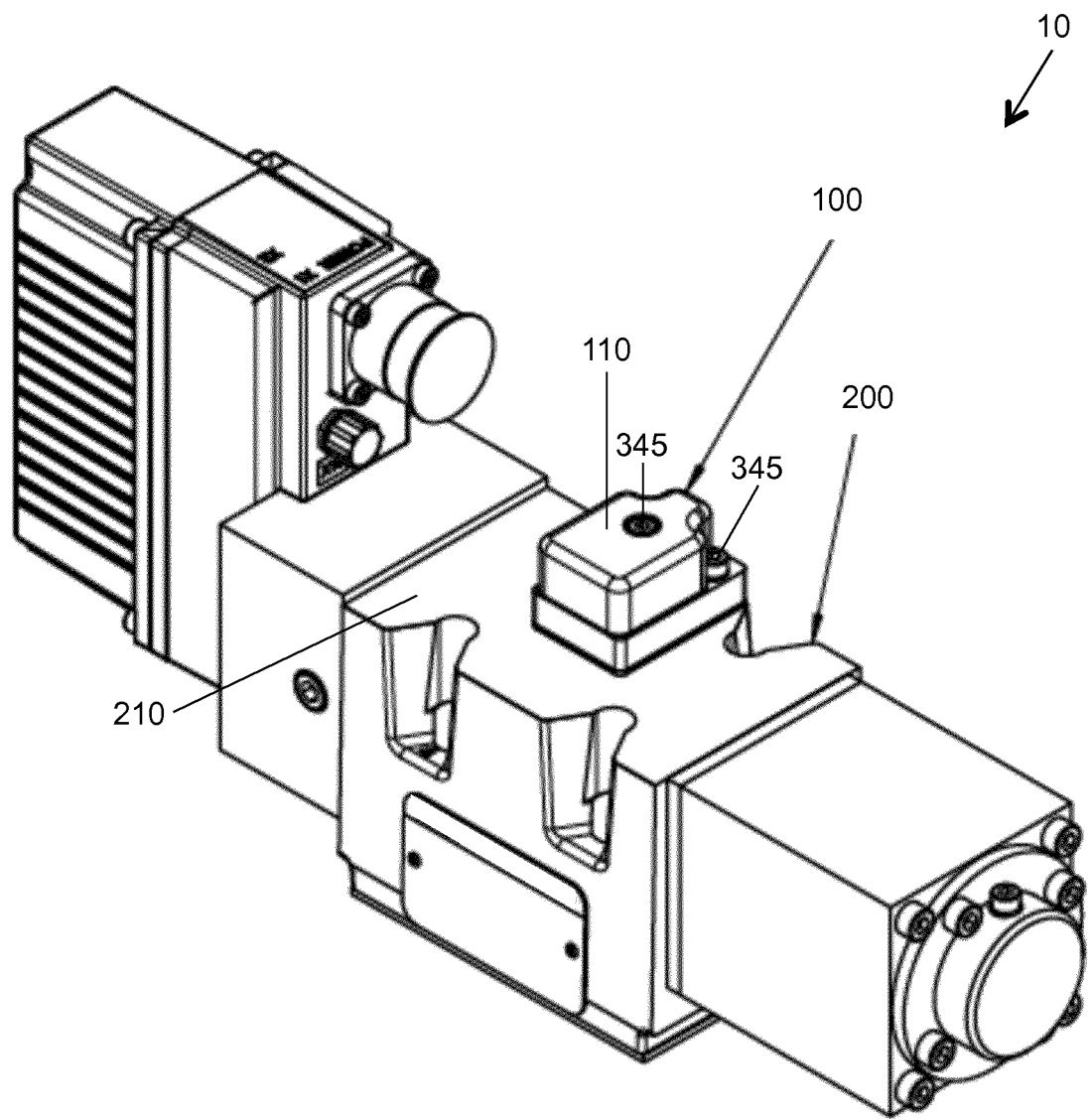
FIG. 1 is a perspective view of an apparatus according to the present invention.

FIG. 1 is a perspective view of one embodiment of a complete apparatus 10 for measuring a hydraulic pressure of a hydraulic component 200 according to the present invention, drawn from diagonally above. Hydraulic component 200 comprises, among many other components, at least one fluid channel 240 (shown in FIG. 6) that holds, in a fluid-proof manner, the fluid whose pressure is to be measured. It is clearly visible, that on the top side of the hydraulic component 200 a mounting plate 210 is arranged. In the embodiment shown, the mounting plate 210 is part of the hydraulic component 200.

In the embodiment shown, pressure sensor module 100 is mounted on top of the hydraulic component 200, on mounting plate 210. The housing 110 of the pressure sensor module 100 is mounted by fixing elements, i.e. in this embodiment some screws 345. This arrangement provides good protection of the components arranged inside housing 110 against mechanical damaging and other harm.

Figure 2A:
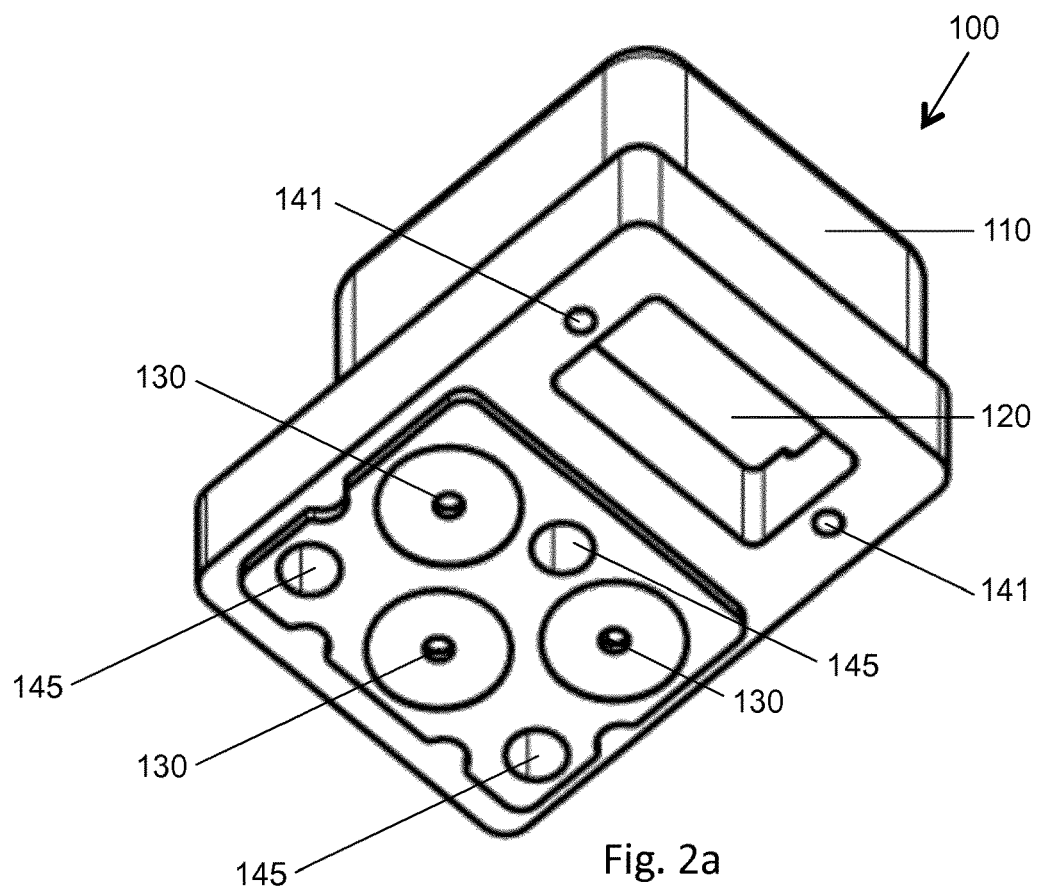
FIG. 2a depicts a perspective view of an embodiment of a pressure sensor module from the bottom.

FIG. 2a shows schematically some details of the pressure sensor module 100 of FIG. 1, depicted from diagonally below. The bottom of housing 110 is formed open, while all its other walls are formed closed. It is also visible that apertures 145 for fixing elements 345 are only passages and are not connected with the interior of housing 110. On the bottom of the housing 110 several apertures are visible. Besides the three apertures (passages) 145 for the screws 345, three apertures 130 for hydraulic channels 240 (shown in FIG. 6) are shown, which lead to pressure sensors 190 (shown in FIG. 6) and terminate the hydraulic channels 240 inside housing 110.

There is also a bigger aperture 120 visible, which is formed to be able to insert one or more contact elements. Left and right of aperture 120 two apertures 141 for guiding elements 341 (shown in FIG. 6) are arranged. Of course, more apertures 141 can be foreseen, for instance to form a kind of key that only fits to an arrangement of several guiding elements 341 and thus only allows a housing of a certain kind to be mated with mounting plate 210. All these apertures are closed when housing 110 is mounted on mounting plate 210.

Figure 2B:
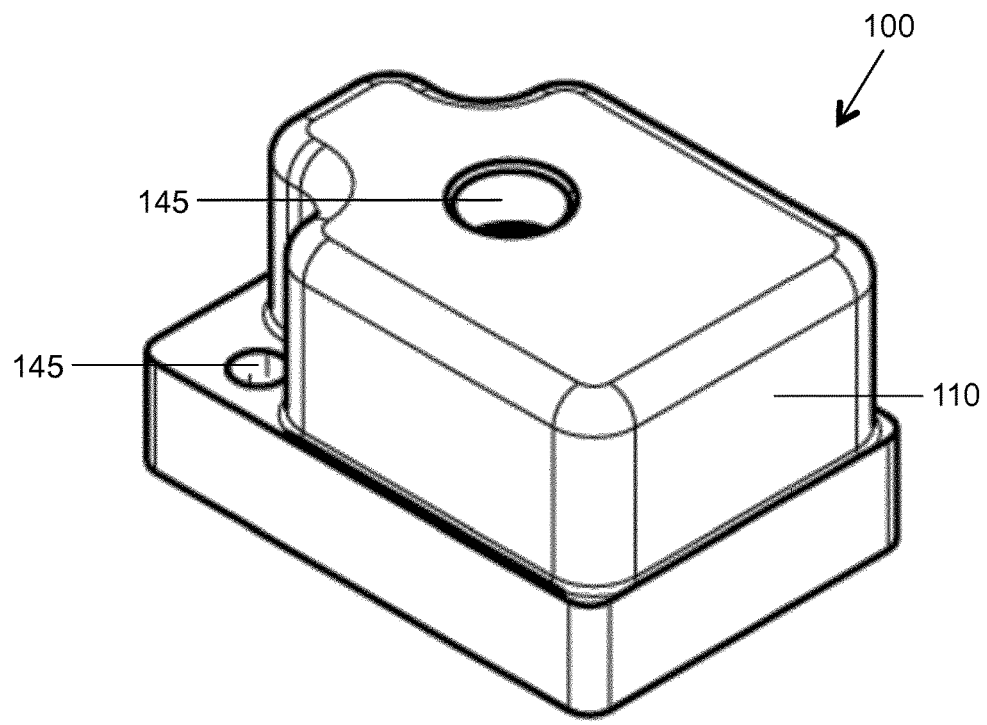
FIG. 2b depicts a perspective view of an embodiment of a pressure sensor module from the top.

FIG. 2b shows schematically an embodiment of the pressure sensor module 100 of FIG. 1, depicted from diagonally above. It is clearly visible that housing 110 is closed from top and its side walls, and is thus protected against external influences. The only openings are three apertures 145 (two of them visible), which are used as passages for some screws 345.

Figure 3:
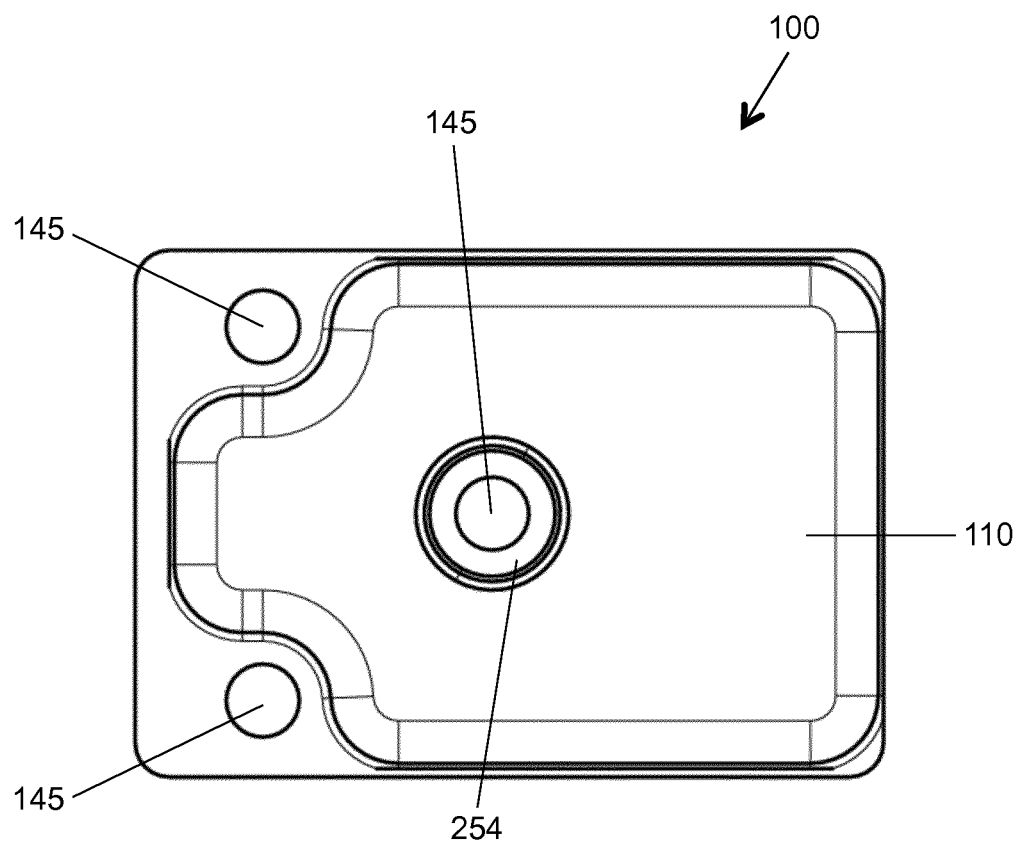
FIG. 3 depicts a schematic top view of an embodiment of a pressure sensor module.

FIG. 3 depicts a schematic top view of the pressure sensor module 100, as shown in the figures above. In this figure, both the closed form of housing 110 and all the three apertures (passages) 145 for screws 345 are clearly visible. For better fitting and tighter closing, Usit rings 245 may be arranged in at least one aperture 145. Here, this is schematically shown in the middle aperture 145.

Figure 4:
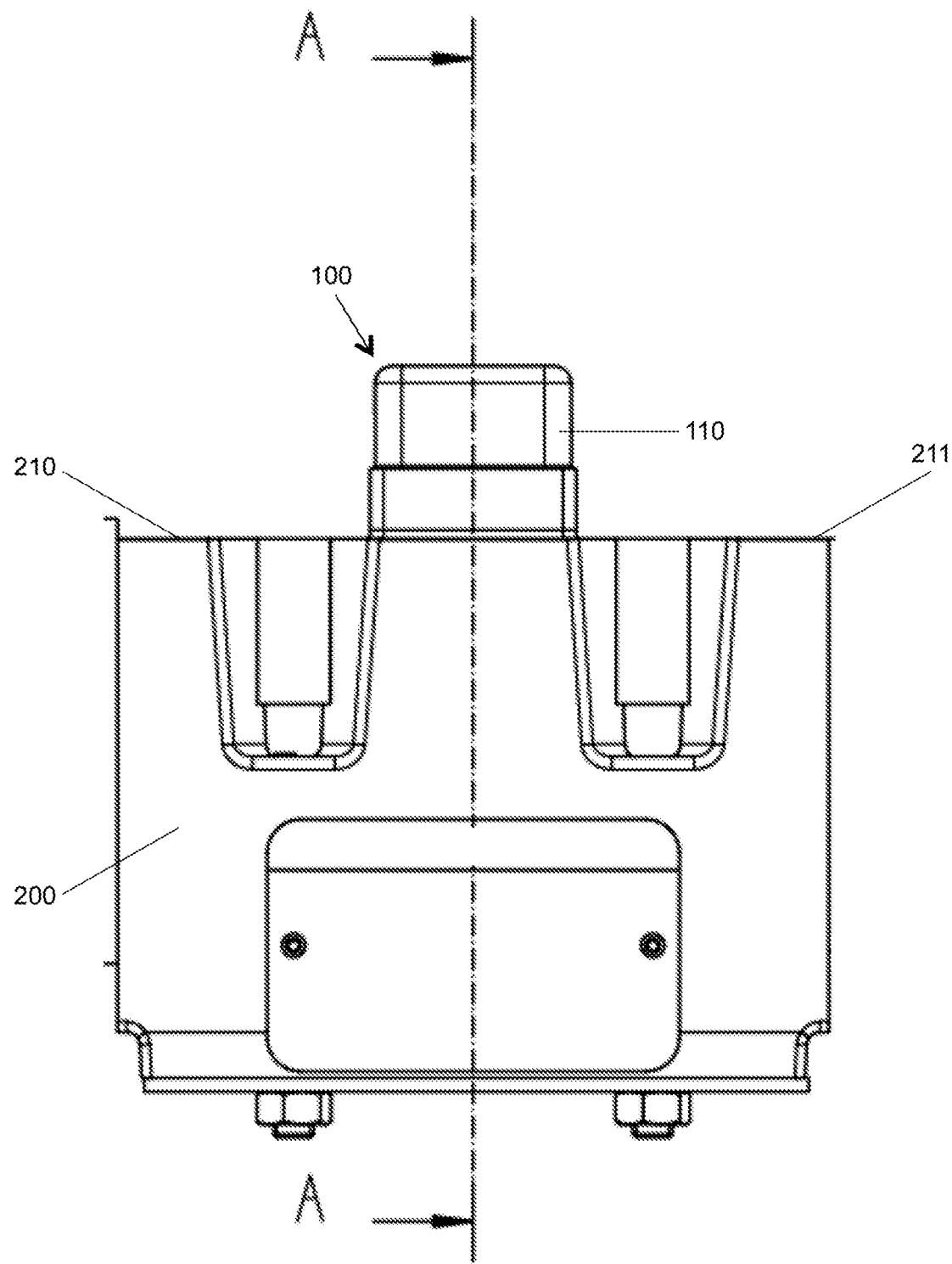
FIG. 4 depicts a schematic side view of a hydraulic component.

FIG. 4 shows a schematic side view of the hydraulic component 200, i.e. the middle part of the hydraulic component 200 as depicted in FIG. 1. The top of the hydraulic element 200, i.e. the mounting plate 210, is formed flat in this embodiment. The surface of the mounting plate 210 is also an embodiment of basic area 211. Mounting plate 210 and pressure sensor housing 110 are assembled in this figure. Mounting of housing 110 on basic area 211 is done by reversible fixing elements. This eases the exchange of pressure sensor module 100. In this embodiment, fixing elements 345 are screws. However, there may be other means to fix housing 110, e.g. by a clamp or stirrup, which may be fixed by a spring or by similar elements.

Basic area 211 is also the basic area for the electrical contact elements 220 (not shown here). In this figure, electrical contact elements 220 are covered by housing 110.

Figure 5:
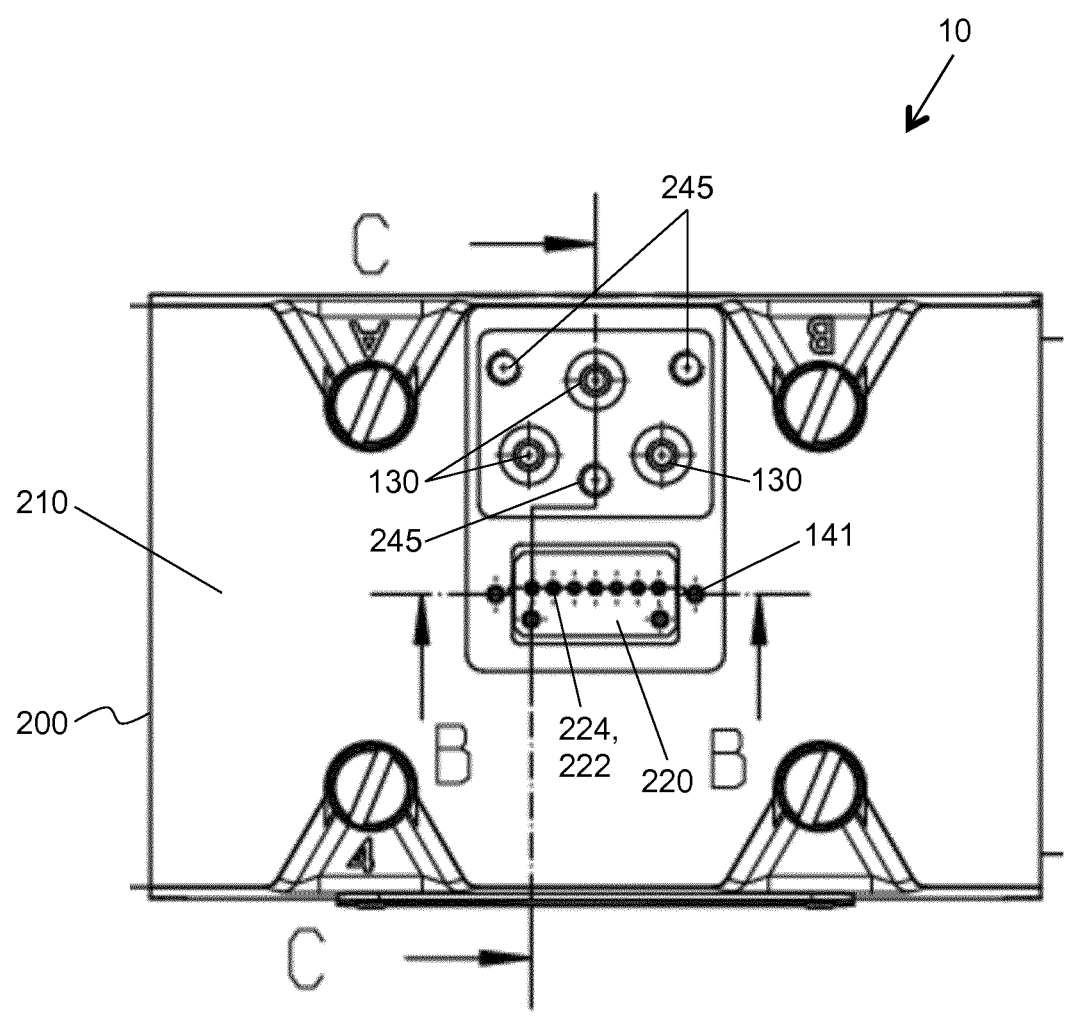
FIG. 5 depicts a schematic top view of the mounting plate section of a hydraulic component.

FIG. 5 shows a schematic top view of the mounting plate section 210, which is part of a hydraulic component 200. Pressure sensor module 100 is removed in this figure. Hence, the three open apertures 130 for hydraulic channels 240 and the three apertures 245 for fixing elements 345 are clearly visible in this figure. Apertures 245 and 130 extend perpendicular to mounting plate 210 (perpendicular to this view), into hydraulic component 200. Apertures 245 lead to hydraulic channels 240. Apertures 130 are holes, typically threaded holes, which build counterparts for fixing elements 345.

Furthermore, a block comprising the electrical contact elements 220 is shown. In this embodiment, the tips (second ends) 224 of seven pins 222 of electrical contact element 220 are visible, also from top view, which protrude from mounting plate 210. Left and right of contact elements 220, apertures 141 for guiding elements are shown. In another embodiment, guiding elements 341 protrude from the mounting plate 210, instead of apertures 141. There may also be a mixture of apertures 141 and guiding elements 341. In another embodiment, there may be more than two apertures 141 or guiding elements 341, they may also be arranged to form a kind of key that only fits to a distinct combination of several apertures 141 and/or guiding elements 341. Hence, this arrangement only allows a housing of a certain kind to be mated with mounting plate 210.

Figure 6:
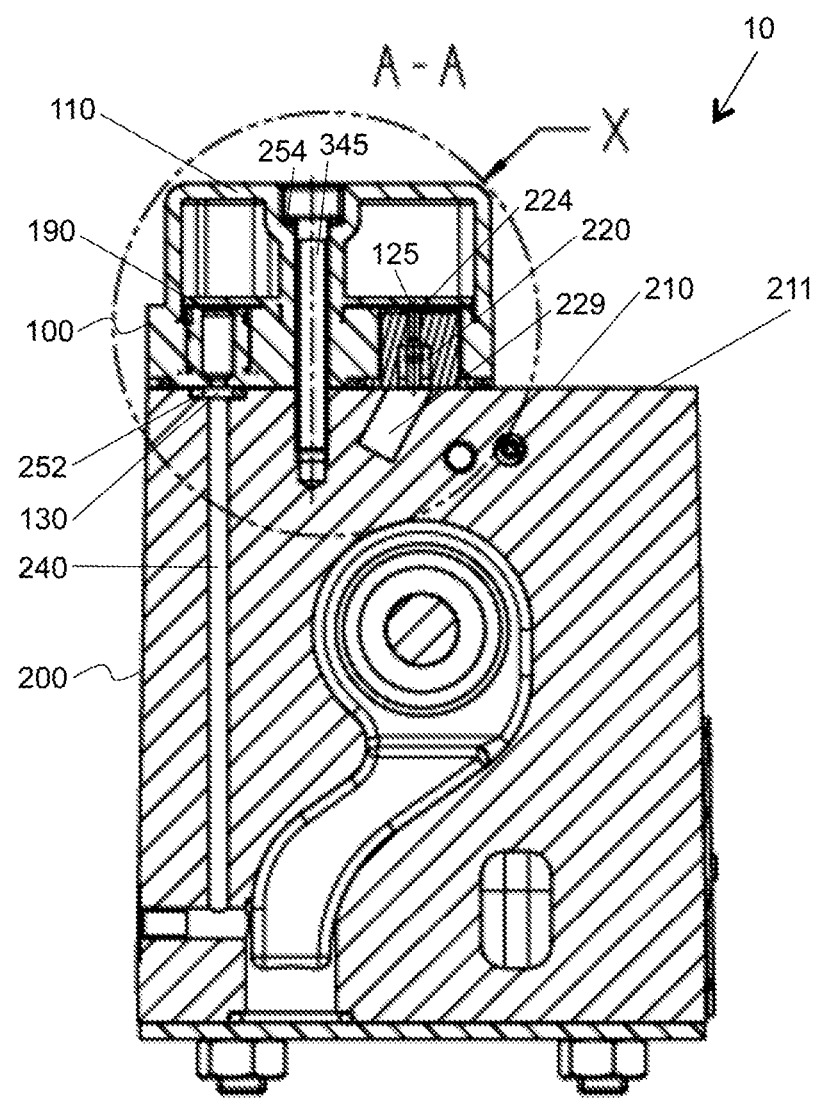
FIG. 6 depicts the hydraulic component of FIG. 4 in section A-A.

FIG. 6 shows section A-A of the hydraulic component 200, cf. FIG. 4, with pressure sensor module 100 being assembled on the basic area 211 of mounting plate 210. Basic area 211 is essentially flat. In alternative embodiments, basic area 211 may be convex or concave or may have other curves. These forms may be necessary due to technical or esthetic reasons, in order to fit better into some specific environments. In these cases, the open bottom of housing 110 needs to be formed accordingly.

When assembled with mounting plate 210, the housing 110 is completely closed, thus isolating the components of the pressure module 100 to the environment outside of housing 110 and by this means protecting its internals. To improve further the leak tightness of housing 110, a sealant 250 is arranged between housing 110 and mounting plate 210 of the hydraulic element 200. In addition, sealant 250 may also isolate the electrical components (e.g. electrical contact elements 220) from the components of the pressure module that may bear high pressure (e.g. aperture 130 or pressure sensor 190), inside housing 110.

There is a hydraulic channel 240 shown, which is continued (to the bottom) within the pressure sensor module 100 and ends up (to the top) with pressure sensor 190. A sealant for the hydraulic channel 240—in this embodiment an O-ring 252—is arranged close to the aperture 130. The electrical contact element 220 is depicted on the right half of pressure sensor module 100. The second ends (tips) 224 of the pins 222 are protruding from the block containing electrical contact element 220. Due to this arrangement, the tips (second ends) 224 of pins 222 have a tight contact with the electrical connector comprising a conductive mating surface 125, which is arranged within housing 110 of pressure sensor module 100. First ends 223 of pins 222 are connected to a wire, or they are formed as a wire. These wires are forwarded via passage (space) 229 to an electrical circuit. Passage 229 is arranged below contact element 220, within hydraulic component 200.

In summary, fixing pressure sensor module 100 on mounting plate 210 has at least following effects: It closes housing 110 against environmental influences outside of housing 110; it closes each hydraulic channel 240 in a fluid-proof manner and connects it to its correspondent pressure sensor 190; it connects electrically each of the second ends (tips) 224 of pins 222 with its correspondent conductive mating surface 125.

Close to the center of pressure sensor module 100 a screw 345 is depicted that is foreseen to fix mounting plate 210 on pressure sensor module 100. In the embodiment shown a Usit-ring 254 is arranged close to the end of the screw 345.

Figure 7:
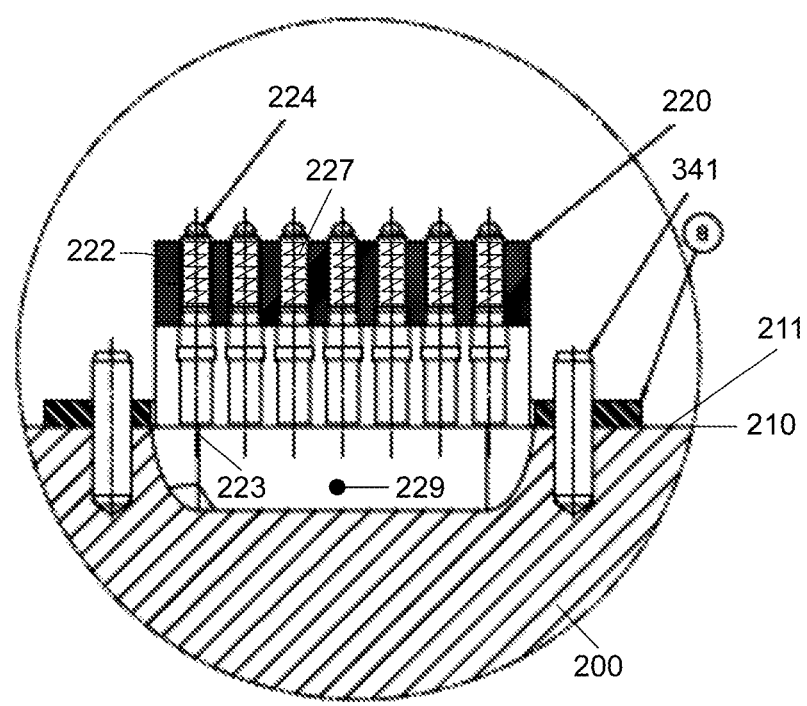
FIG. 7 depicts a schematic cross-section of an embodiment of the contact element on a mounting plate.

FIG. 7 depicts some details of electrical contact element 220, guiding elements 341, and a section of hydraulic component 200. In this embodiment, guiding elements 341 protrude from hydraulic component 200, thus guiding the apertures 141 (not shown here) of pressure sensor module 100. Thus, the combination of guiding elements 341 and apertures 141 avoids incorrect assembling of the pressure sensor module 100 on hydraulic component 200.

The contact element 220 is a block, from which pins 222 protrude. Connecting pins 222 are spring loaded and essentially perpendicular to the basic area 211 of mounting plate 210. The pins 222 are essentially straight and have two ends: First ends 223 of pins 222 are connected to a wire, or they are formed as a wire. Second ends 224 are formed as tips and direct away from basic area 211.

Below the contact element 220 there is some space 229, which has the function of a passage for wires. These wires transmit the signals, which come from one or more pressure sensors 190. The signals are led from pressure sensors 190 to electrical connectors comprising a conductive mating surface 125. When assembled, each of the conductive surfaces 125 is electrically connected with its correspondent second end (tip) 224 of an electrically conductive pin 222. Then, the signals are led through electrically conductive pin 222 to its opposing end, i.e. to the first end 223. Each first end 223 of each pin 222 is connected to a wire, or is formed as a wire. These wires are collected in passage (space) 229 and forwarded from there to an electrical circuit. This electrical circuit receives and processes the signals that originate from pressure sensors 190. Passage 229 is arranged below contact element 220, within hydraulic component 200.

Furthermore, sealant 250 is visible, which helps to close the housing 110 (not shown here) in a fluid-proof manner.

Figure 8:
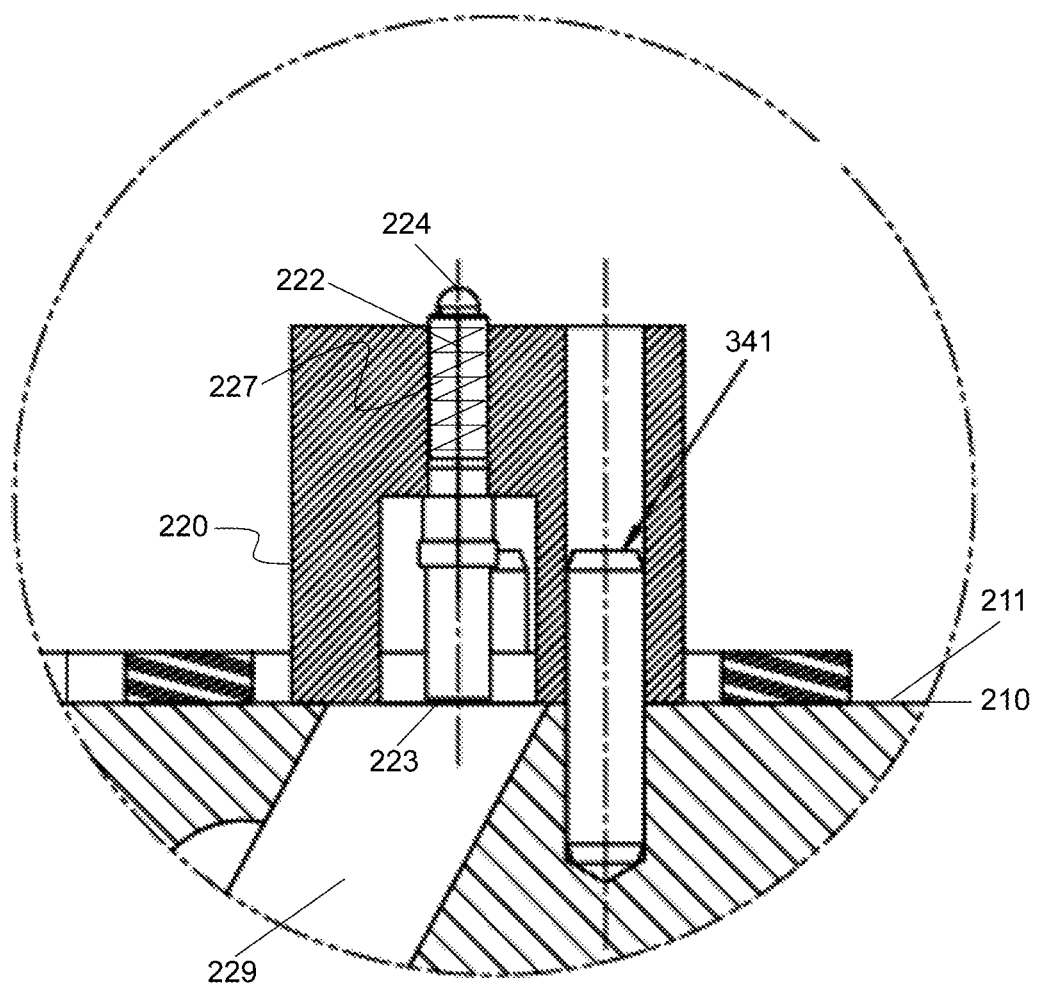
FIG. 8 depicts a schematic cross-section of an embodiment of one spring loaded connecting pin and one guiding element.

FIG. 8 depicts another schematic section through contact element 220. It shows in detail one pin 222, its first end 223 and its protruding second end 224. The pin 222 is highly conductive, for a low resistance between its first end 223 and its second end 224. Spring 227 shifts second end 224 out of contact element 220. The complete pin 222 or a set of pins 222 is arranged within contact element (block) 220. The contact element 220 is mounted on basic area 211 of mounting plate 210. A space 229 for wires from first end 223 is arranged below contact element 220. In the embodiment shown there is an additional guiding element 341, which also holds contact element 220.

Figure 9A:
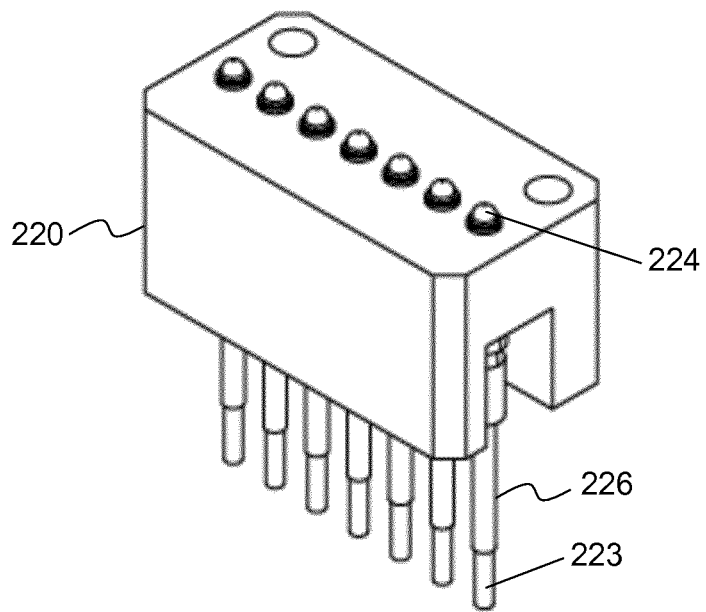
FIG. 9a depicts a schematic view of an embodiment of the contact element.
Figure 9B:
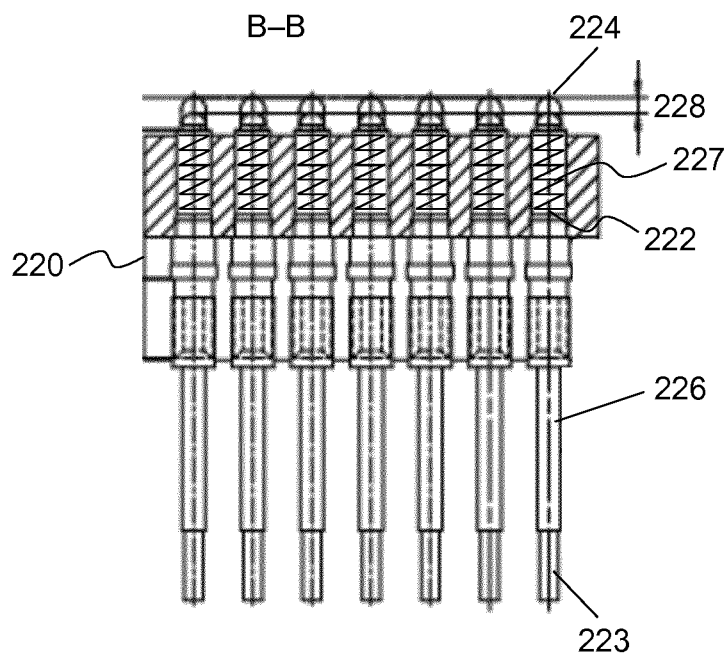
FIG. 9b depicts a schematic cross-section of an embodiment of the contact element.

FIG. 9a shows a schematic view of the contact element 220, from diagonally above. On top of contact element 220, there are seven protruding second ends 224 are visible. Pins 222 and their springs 227 are covered by the housing of contact element 220. Wires that form first end 223 protrude from bottom of contact element 220. These wires are connected to first ends 223 of pins 222, or first ends 223 are formed as a wire. Each wire is covered, at least partly, by a shrink sleeve 226 for electrical isolation. FIG. 9b shows a part of schematic section B-B, according to FIG. 5, through contact element 220. There are spring-loaded pins 222, surrounded by springs 227. The springs 227 are mechanically connected to the pins 222 in a way, that connecting pins 222 are biased by a force that shifts them, respectively their tips 224, away from a basic area. When released, pins 222 use the complete amount of spring travel 228. When assembled, the tips 224 of conductive pins 222 are pressed with the force of springs 227 against electrically conductive surfaces 125 inside housing 110. In one embodiment of an apparatus 10 according to the present invention, the electrical connector 125 comprising mating surface is essentially flat, with a size from 2 mm×2 mm to 4 mm×2 mm. The electrical connector 125 is designed as deformable, in elastic or plastic manner, particularly in a range from 1% to 20% or from 5% to 10%, of the diagonal of the electrical connector. The springs 227 actually deform electrical connector 125 at least part wise, when pressure sensor module 100 is assembled on mounting plate 210. This deformation even holds the tips 224 of conductive pins 222 even tighter than a simply flat formed electrical connector 125. Hence, the combination of springs 227 that shift tips 224 of conductive pins 222 to deformable electrical connectors 125 builds up a very tight electrical connection, with low ohmic resistance. Furthermore, this connection is very suitable in rough environments. In tests conducted with a series of apparatus according to the present invention, contact is kept even at accelerations of 30 g, applying frequencies in a range from 10 to 2000 Hz. Further protection is given by the mechanical construction, which closes the housing 110 in a fluid-proof manner and provides protection against a broad range of mechanical threats. On the bottom, first ends (wires) 223 of pins 222 are shown. Each wire is covered, at least partly, by a shrink sleeve 226 for electrical isolation.

LIST OF REFERENCE SIGNS 10 apparatus
100 pressure sensor module
110 housing of pressure sensor module
120 aperture for contact element or conductive mating surface
125 electrical connector comprising conductive mating surface 130 aperture for fluid connector
141 aperture for guiding elements
145 aperture for fixing elements
190 pressure sensor
200 hydraulic component
210 mounting plate
211 basic area
220 electrical contact element (block)
222 spring loaded connecting pin
223 first end (wire) of connecting pin
224 second end (tip) of connecting pin
226 shrink tube
227 elastic element, spring
228 spring travel
229 passage for wires, space for internal cabling
240 fluid channel
250 sealant
252 sealant, O-ring
254 sealant, Usit-ring
341 guiding element
345 fixing element

The invention claimed is:

1. An apparatus for measuring a hydraulic pressure of a hydraulic component, comprising:
 a pressure sensor module; and
 a mounting plate that is at least one of (i) an outer contour of the hydraulic component (ii) connectable with the hydraulic component in a substance-to-substance manner (iii) connectable with the hydraulic component in a form-locking manner and (iv) connectable with the hydraulic component in a force-locking manner,
 wherein the pressure sensor module includes a housing, at least one pressure sensor for determining the pressure of a fluid, at least one fluid connector for hydraulic connection of the hydraulic component, and at least one electrical connector including a conductive mating surface;
 the mounting plate has a basic area and at least one electrical connecting pin, whereby the connecting pin is spring loaded and essentially perpendicular to the basic area of the mounting plate, the first end of the connecting pin is oriented towards the basic area, the second end of the connecting pin is oriented away from the basic area, the second end of the connecting pin is pressed, by means of an elastic element, away from the basic area and towards the electrical connector when the mounting plate and the pressure sensor module are assembled;
 the pressure sensor module and/or the mounting plate have at least one guiding element;
 the pressure sensor, the fluid connector, and the electrical connector are arranged within the housing;
 the mounting plate is connectable with the pressure sensor module in a force-locking manner; and
 when the mounting plate and the pressure sensor module are assembled, the electrical connecting pin is connected with the electrical connector via its second end.

2. The apparatus according to claim 1, wherein the apparatus further comprises a plurality of connecting pins and electrical connectors.

3. The apparatus according to claim 1 wherein at least one fixing element is used for connecting of the pressure sensor module and the mounting plate in a form-locking and/or force-locking manner.

4. The apparatus according to claim 1, wherein at least one sealant is arranged between the pressure sensor module and the mounting plate and/or at least one sealant is arranged between the fluid connector of the pressure sensor module and the hydraulic connection of the hydraulic component.

5. The apparatus according to claim 1, wherein the pressure sensor has a measuring range from 0 to 400 bar.

6. The apparatus according to claim 1, including more than one pressure sensor.

7. The apparatus according to claim 6, wherein at least one pressure sensor is one-to-one connected with a fluid channel of the hydraulic component and is arranged within the housing.

8. The apparatus according to claim 1, wherein the housing of the pressure sensor module is manufactured from a group of materials that includes die casting, particularly aluminum die casting, steel, aluminum, and fiber-reinforced plastics.

9. The apparatus according to claim 1, wherein the electrical connector, especially the conductive mating surface of the electrical connector is flat, with a size from 2 mm×2 mm to 2 mm×4 mm, and is deformable, in an elastic or plastic manner, particularly in a range from 1% to 20% of the diagonal of the electrical connector.

10. The apparatus according to claim 1, wherein the electrical connector, especially the conductive mating surface of the electrical connector is made from copper, aluminum, or nickel and is coated with a conductive coat, particularly with gold.

11. A combination of the apparatus of claim 1 with at least one of a hydraulic valve, a hydraulic control and/or steering device, a hydraulic flow control, a hydraulic pressure control, and precision scales/balances.

* * * * *